United States Patent [19]

Thorn et al.

[11] 3,874,788
[45] Apr. 1, 1975

[54] SLIDE CHANGING MECHANISM
[75] Inventors: Herbert Thorn, Jamaica; Harvey Berkin, Merrick, both of N.Y.
[73] Assignee: Ideal Toy Corporation, Hollis, N.Y.
[22] Filed: Sept. 24, 1973
[21] Appl. No.: 400,455

[52] U.S. Cl. .............................................. 353/111
[51] Int. Cl. ......................................... G03b 23/02
[58] Field of Search ......................... 353/103–117, 353/25–27

[56] References Cited
UNITED STATES PATENTS

| | | | |
|---|---|---|---|
| 2,434,785 | 1/1942 | Blumenstein | 353/112 |
| 2,849,814 | 9/1958 | Rideout | 353/112 |
| 3,002,426 | 10/1961 | McCabe | 353/112 |
| 3,527,530 | 9/1970 | Hughes | 353/111 |

Primary Examiner—Richard E. Aegerter
Assistant Examiner—A. J. Mirabito
Attorney, Agent, or Firm—Richard M. Rabkin, Esq.

[57] ABSTRACT

A slide projector has a projection opening therein and a vertically extending rack or magazine for supporting a vertical column of slides in edge to edge relation above and adjacent to the projection opening. The slides in the rack fall therefrom, under the influence of gravity, into a slide transport and changing mechanism which receives and supports the lowermost slide in the stack in position in front of the projection opening for projection. The slide changing mechanism selectively moves that lowermost slide from in front of the projection opening to a discharge position while simultaneously supporting the remainder of the slides in the stack in the magazine until the slide changing mechanism is returned to its original position wherein the next slide in the magazine falls into place in front of the projection opening.

19 Claims, 4 Drawing Figures

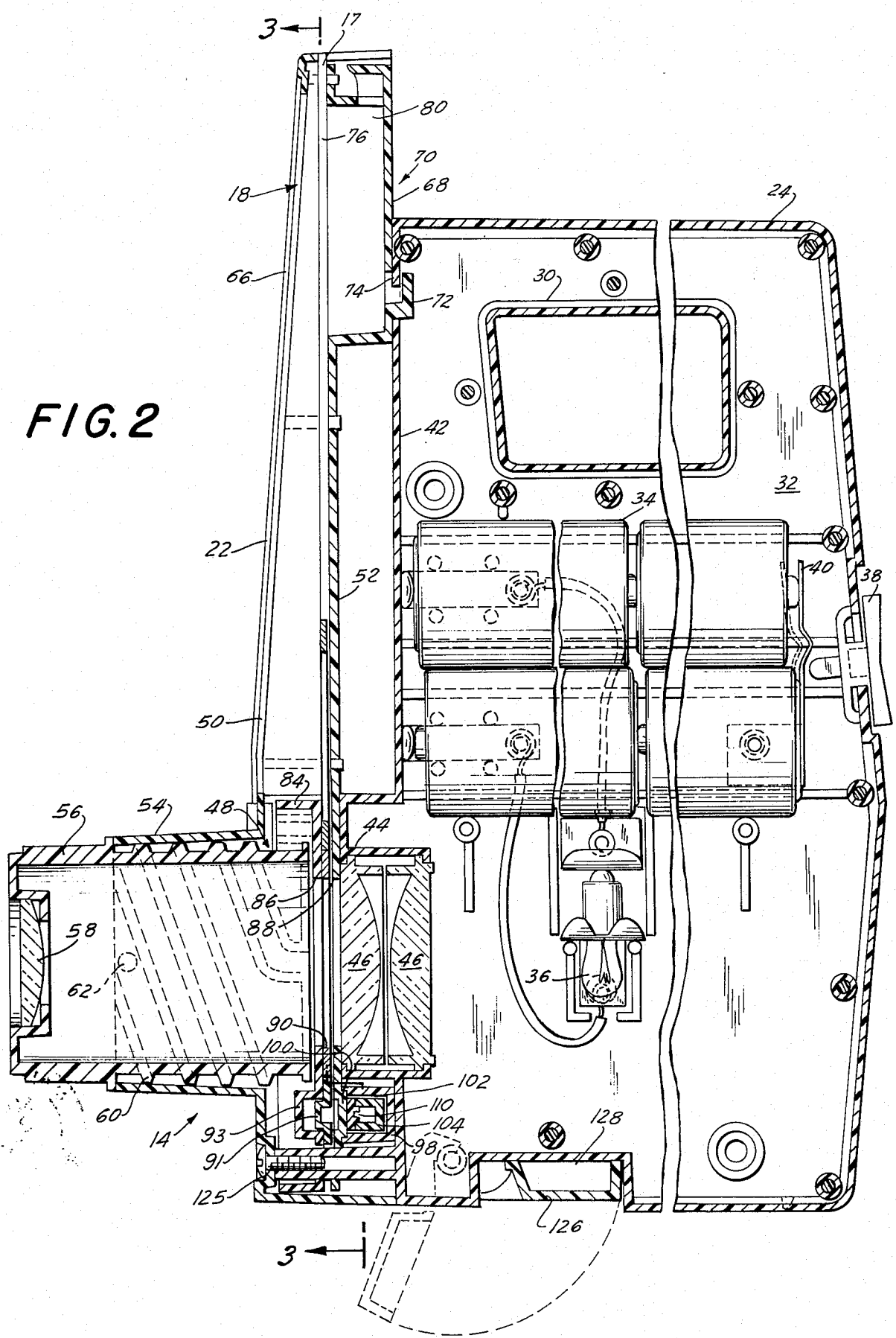

SLIDE CHANGING MECHANISM

The present invention relates to slide projectors and, in particular, to a slide changing mechanism for use in a toy slide projector.

Slide projectors for use by children have been previously proposed which will permit children to project pre-formed slides on a wall, screen or the like. Although there have been numerous such projectors, each suffers from the problem that it is relatively difficult for small children to operate. Moreover, the structures required for changing the slides are often highly complicated and fragile so that they cannot withstand the wear and tear imposed on such products when used by small children. Thus, such complicated mechanical slide changing mechanisms in previously proposed devices often break down shortly after they are first used by the children.

Accordingly, it is an object of the present invention to provide a slide projector which is relatively simple and durable in construction.

Another object of the present invention is to provide a slide changing mechanism in a toy slide projector which mechanism is of rugged and simple construction.

Another object of the present invention is to provide a slide changing mechanism for a slide projector which is relatively economical in manufacture and durable in use.

In accordance with an aspect of the present invention a slide projector having a housing and a projection opening therein through which slides are projected in a relatively conventional manner has a slide changing mechanism which includes a slide support magazine located to receive and support a vertical column of slides in edge to edge relation to each other adjacent to and in substantially vertical alignment with the projection opening of the housing. A slide transport plate is slidably mounted in the housing adjacent the projection opening, below the magazine, and is adapted to be moved between a first slide projection position and a second slide discharge position with respect to said projection opening.

The transport plate is a relatively flat elongated thin plate having first and second end portions respectively positioned beneath the slide magazine in the first and second positions of the plate. The first end portion of the transport plate has a slide receiving recess formed therein which opens upwardly towards the magazine and which is positioned to receive the lowermost slide in the magazine when the transport plate is in its first position. The recess is located in alignment with the projection opening when the plate is in its first position so that the lowermost slide in the magazine is projected by the projector.

The recess in the transport plate supports the lowermost slide in the magazine when the plate is moved from the first position to its second slide discharge position. During that movement of the plate, the upper edge portion thereof which extends from the recess towards the second end of the plate edge engages the next slide in the magazine to support that next slide and the remainder of the slides in the magazine during this movement of the transport plate from said first to said second discharge position and from said discharge position to said first position, after the previously projected slide has been discharged at the discharge position.

The above, and other objects, features and advantages of the present invention will be apparent in the following detailed description of an illustrative embodiment thereof which is to be read in connection with the accompanying drawing, wherein:

FIG. 2 is a side sectional view taken along line 2—2 of FIG. 1;

Figure 1:
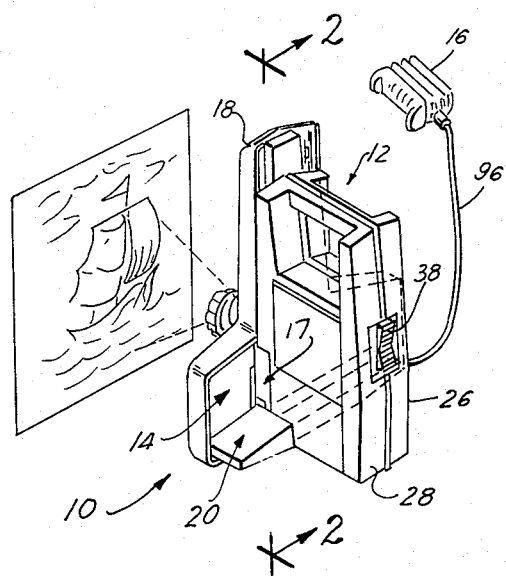
FIG. 1 is a perspective view of a toy projector mechanism constructed in accordance with the present invention.

Referring now to the drawing in detail and initially to FIG. 1 thereof, a projector 10, constructed in accordance with the present invention is adapted to project transparent slides or the like on a wall or screen by passing light through a series of lenses and the transparent slide. The projector includes a two part housing 12 having a slide changing and transport mechanism 14 which is pneumatically operated through a hand operated bellows 16, as described more fully hereinafter.

Individual slides, which may be of the standard size and format for 35 mm. slides or "2 × 2" slides, are manually placed in a magazine 18 which forms a portion of housing 12. The magazine holds the slides in edge to edge supported relationship to one another thereby to form a vertical column of slides. Upon squeezing of the bellows 16, an individual slide is moved from a position 17 adjacent a projection opening in the projector through which light is projected, to a discharge position 20. Upon release of the bellows the slide changing mechanism automatically returns the slide changer to its original position for receipt and support of the next slide from magazine 18.

Projector housing 12 includes, as seen most clearly in FIG. 2, a front housing section 22 which contains the slide magazine 18, the slide changing and transport mechanism 14, and a rear housing section 24. The latter is formed of two substantially identical halves 26, 28 which are joined together in edge to edge relation to form the completed housing section 24 by an adhesive or by a plurality of bolts, screws or the like. These housing sections cooperate to define a handle 30 by which the projector can be carried, and provide an interior cavity 32 in which a plurality of batteries 34 are mounted in order to supply current to a bulb 36 for projecting the slides. Bulb 36, which is mounted within housing section 24 in any convenient manner, is energized by the operation of a switch 38 mounted at the rear of housing section 24 through the spring contact 40 mounted adjacent the end of the mounting positions for the batteries 34.

The front wall 42 of housing portion 24 includes a mounting boss 44 formed integrally therein in which a pair of lenses 46, commonly known as condenser lenses, are mounted in substantial axial alignment with the bulb or source of light 36.

Front housing section 22 of projector 10 has a projection opening 48 which, in the assembled configuration of the projector, is in axial alignment with lenses 46. Magazine 18 is adapted to supply individual slides into a position adjacent the projection opening in alignment with lenses 46 so that light originating with bulb 36, passes through lenses 46 and the slide located in front of the lenses, for projection.

More specifically, front housing section 22 includes a main frame member 50 and a rear frame member 52 operatively connected in any convenient manner, in back to back relationship, as seen in FIG. 2, with front frame member 50 having a boss or collar 54 formed thereon for providing mounting support for a lens barrel 56. Collar 54 is located to support lens barrel 56 in axial alignment with condenser lenses 46 of housing section 24.

Lens barrel 56 provides mounting support for an objective lens 58 and has a threaded exterior surface 60 formed thereon which cooperates with a pin 62 extending inwardly from the inner surface 64 of collar 54 so that the distance between the objective and condenser lenses may be varied by the operator as desired, simply by turning the barrel 56. In this manner the projector is conveniently focused so as to properly project a slide positioned between the objective lens and the condenser lenses as described more fully hereinafter.

Both the front and rear frame members 50, 52 of housing section 22 include elongated vertically extending portions 66, 68 respectively, which cooperate to define the slide magazine or storage rack 18. Rear frame portion 52 includes an upper section 70 which is spaced from front frame portion 66, as seen in FIG. 2, and provides a hook member 72 by which front housing section 22 is located with and connected to rear housing section 24 when hook 72 is engaged within an opening 74 formed in the front wall portion 42 of rear housing section 24. The remainder of frame portion 52 below the portion 70 thereof is closer to the front frame portion 66, as also seen in FIG. 2.

The vertically extending portions 66, 68 of the front and rear frame portions of housing section 22, cooperate to define therebetween a guide track 76 which forms the magazine 18. The latter is open at its top 77 to permit slides to be placed in the guide track one at a time in edge to edge relation.

Guide track 76 is defined between a pair of flanges 78 extending rearwardly from the inner surface of the front wall portion 22 (see FIG. 4) and the rear frame portion 52. The latter, at its upper section 70 includes a plurality of forwardly extending flanges 80 which cooperate with flanges 78 to define the upper portion of track 76 while the lower portion of the frame member 52 has a recess 82 formed therein, as seen most clearly in FIG. 4, which defines the track 76 with flanges 78 and which also serves to guide the slides in the magazine. The dimension of slot 76 between the shoulders 83 of recess 82 and between flanges 78 and recess 82, is such that the slides 85 are maintained in edge to edge relationship with respect to one another with each slide supporting the next successive slide and the slides above it on its edge. The bottommost slide in the stack is supported in the slide changing mechanism 14, as described more fully hereinafter.

Figure 4:
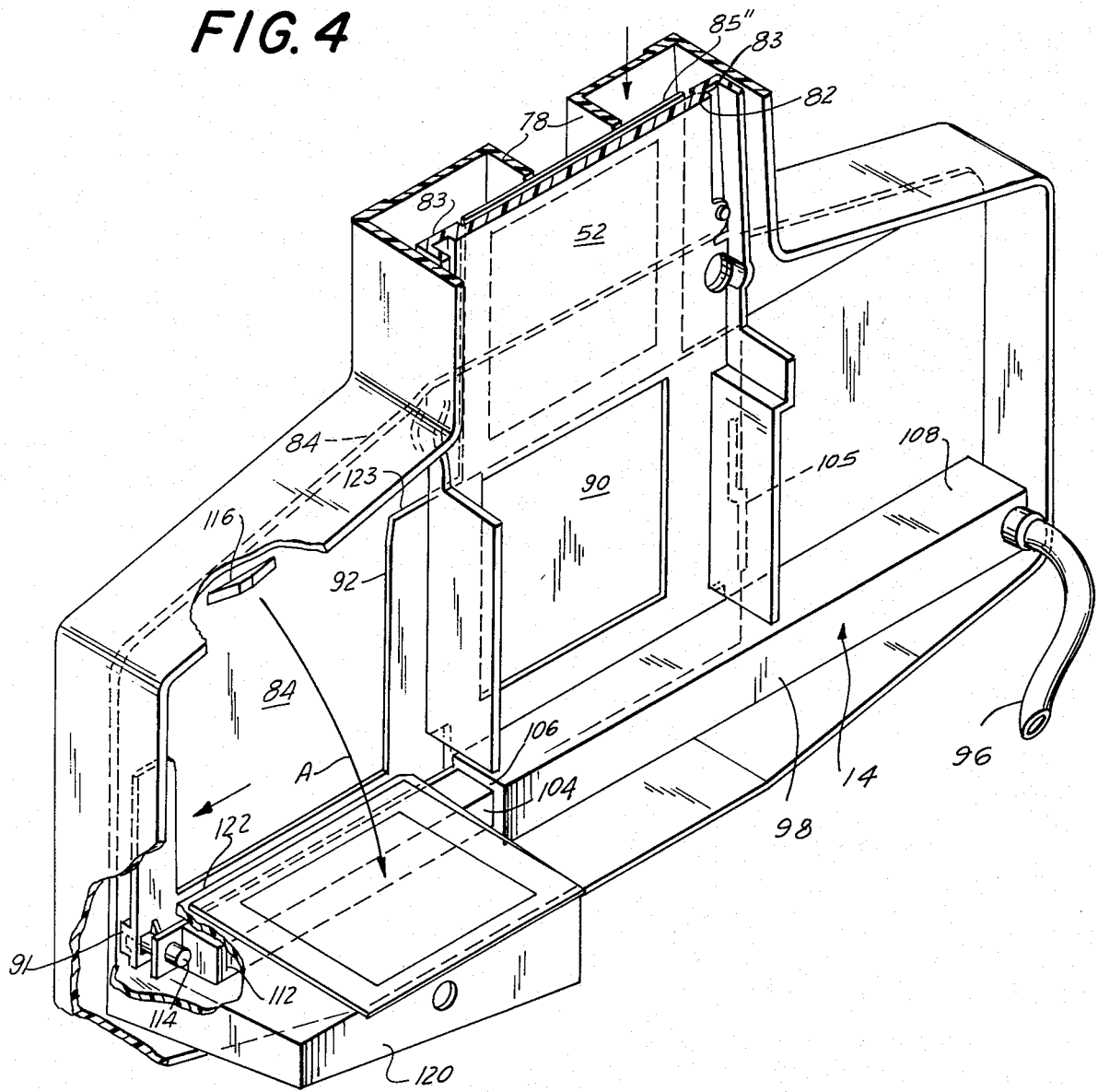
FIG. 4 is a partial perspective view, with parts broken away, of the slide transport mechanism utilized in the projector of the present invention.

The lowermost portion of the magazine 18 or guide track 76 is defined by a third frame member 84 of front housing section 22, which frame member is mounted, as seen in FIG. 2, in slightly spaced relation to the rear frame portion 52 and is connected to frame portion 52 in any convenient manner, as would be apparent to those skilled in the art. This frame member is a relatively wide, substantially flat plate, as seen in FIG. 4, which encompasses substantially the entire lower portion of the front housing section 22 and closes the rear portion of the front frame member 50.

Frame members 84 and 52 have projection openings 86, 88 respectively formed therein, in axial alignment with the lenses 46, 58, thereby providing a clear path of travel for the light from light source 36 to the exterior of the housing. In accordance with the present invention, the slides from magazine 18 move directly into position between the projection openings 86, 88, so that light can be passed therethrough thereby causing the slides to be projected.

Figure 3:
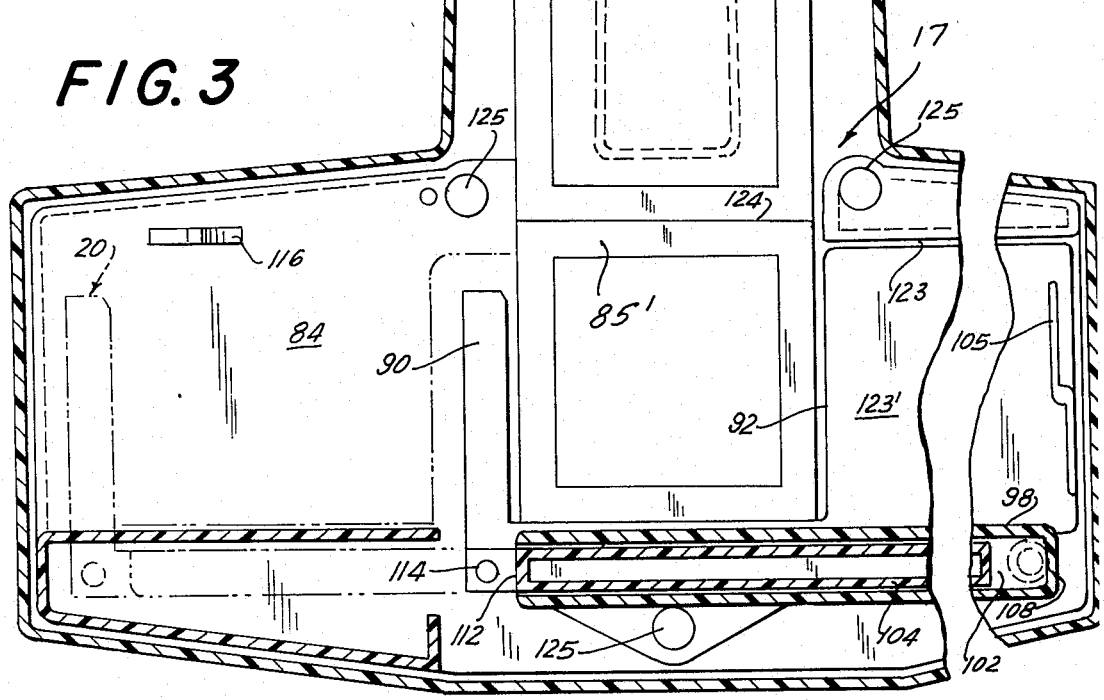
FIG. 3 is a partially broken away sectional view taken along line 3—3 of FIG. 2.

Slide changing mechanism 14, which supports the slides in the track 76 or magazine 18, between openings 86, 88, includes a transport plate 90 which is slidably mounted in front housing section 22 for lateral reciprocal movement with respect to the projection openings 86, 88. Plate 90 has a slide receiving recess 92 formed at one end thereof, (the left end as seen in FIGS. 3 and 4) which recess has a width that is substantially complementary to the width of the slides to be projected. By this arrangement, when a series of slides 85 are placed in edge to edge relation in magazine 18, the first slide falls to the base of the projector, wherein it enters the recess 92 in slide plate 90 when the transport mechanism is in its projecting position, as shown in FIG. 3. Thereafter, placement of additional slides in magazine 18 causes the slides to be supported in edge to edge vertical relation to one another, as also seen most clearly in FIG. 3.

When it is desired to change slides, plate 90 is moved from its projecting position, illustrated in solid lines in FIG. 3, to its discharge position, illustrated in phantom lines in FIG. 3. This is accomplished by the operation of bellows 16. The latter is connected through a flexible conduit 96 to an air cylinder 98 mounted on the rear frame portion 52 of front housing section 22. In the illustrative embodiment of the invention, air cylinder 98 comprises a three sided generally elongated rectangular member, as seen in section in FIG. 2, with the opened side thereof secured in air tight relationship, as for example, by an adhesive or the like, to an elongated boss 100 formed on the lower end portion of the frame member 52. In this manner a substantially air tight chamber 102 is formed which is in fluid communication through conduit 96 with the bellows 16. A piston 104 is slidably received within the chamber 102 and extends out of the opened left end 106 thereof (of course, the opposite end 108 of the cylinder is closed).

Piston 104 has a cross-section which is substantially equal to the cross-section of the chamber 102 so that there is a relatively tight but free sliding relationship between the piston and the cylinder. The piston can be formed, as seen in FIG. 2 in section, from a three sided elongated member having its open end closed by a flat plate 110 or the like. In any case, the exposed outer end 112 of the piston 104 is operatively connected in any convenient manner, as for example, by a pivot pin 114 or the like, to the transport plate 90. In this manner, reciprocation of the piston 104 is transmitted directly to the plate 90 to cause reciprocation thereof.

Guide plate 90 is guided during reciprocation in a straight path of travel by an elongated ridge 91 formed therein which ridge is received in a complementary recess 93 in frame member 84. The cooperation of this ridge and recess structure insures that the transport plate will move in a straight line upon actuation of piston 104 and also prevents vertical movement and disassembling of plate 90 from between frame members 84, 52.

By this construction of the invention, when the transport or slide changing plate 90 is in the position illustrated in FIG. 3, wherein it supports the lowermost slide 85' of the stack of slides in alignment with projection openings 86, 88, piston 104 is contained entirely within the cylinder 98. When it is desired to change the slide mechanism, the operator simply squeezes bellows 16, causing an increase in pressure within the chamber 102 at the right end of piston 104, as seen in FIG. 3, thereby causing the piston to move to the left, to the phantom line position thereof. Since the lowermost slide 85' is retained and supported within the recess 92 of plate 90, that slide moves with the plate out of the slot 76, to the discharge station 20. At that location, frame member 84 has a cam surface or bump 116 formed on the rear side thereof in position to engage the top edge of the slide as plate 90 approaches its phantom line position in FIG. 3. This cam surface causes the slide to move rearwardly, as illustrated by the arrow A in FIG. 4, so that it falls from the recess 92.

In order to prevent damage to the slide and the film therein when the slide is removed from transport plate 90 in this manner, frame member 84 is provided with a rearwardly extending table or platform 120 on which the slide falls. It is noted that table 120 will of course have a slot or space 122 formed therein so as to permit the transport plate 90 to move into position between the table and the vertical wall portion of frame member 84, as seen in FIG. 4.

An important feature of the present invention is the fact that transport plate 90 is elongated and has a substantial length to the right of recess 92, thereby to define a top edge 123 which is adapted to support the stack of slides 85 in magazine 18 during transport of the lowermost slide. That is, when plate 90 is moved towards the left, so that lowermost slide 85' is removed from beneath the next slide in the stack, edge 123 of plate 90 is moved into position below that next slide 85'' so as to engage the edge 124 of that slide and support the same in a relatively fixed vertical position during movement of plate 90. Upon return of the plate 90 to its original solid line position, the next slide 85'' in the stack thence falls by gravity into recess 92. The remainder of the slides in the stack, of course, also move downwardly in magazine 18 but remain supported one upon the other in edge to edge relation on the slide 85'' which has now become the lowermost slide in the stack. Because the width of the slot 76 is selected so as to be substantially equal to the width of the slides, the slides will remain in edge to edge relationship and will not fall into position adjacent one another in face to face relationship. In addition, lateral movement of the lowermost slide does not effect lateral movement of the upper slides since such lateral movement is constrained by the shoulders 83 of the recess 82 formed in the frame member 52.

Another feature of the construction of the present invention is that transport plate 90 interferes with the light path from bulb 36 when it is moved to discharge a slide from the projector. That is, when the plate is moved into its phantom line position in FIG. 3, the right end portion 123' blocks openings 86, 88. Accordingly, the projector simulates the operation of conventional commercial slide projectors which block the light source when slides are changed. Thus, the projector provdies a more realistic action for a child using it.

In order to retract slide plate 90 from its phantom line position illustrated in FIG. 3 to its original solid line position, so as to present the next slide in position for presentation, the operator simply releases a bellows 16. As a result, the pressure in chamber 102 is substantially reduced and the piston 104 is automatically returned to its original position under the suction produced by the expanding bellows 16. In addition, if the operator chooses not to use bellows 16 to operate plate 90, the plate may be provided with a handle 105 so that it can be moved manually between its two positions.

In the assembled configuration of housing 10, front frame section 22 is simply connected to the rear housing section 24 by three blots which can be inserted through bolt holes 125 in the front frame housing section 22 and secured to the rear housing section 24, for example, as illustrated in the lower portion of FIG. 2. The base of housing section 24 also includes a lever 126, which is pivotally mounted thereon and which is adapted to be moved from a solid line position, wherein it is retained within a recess 128 of the housing, to the dotted line position thereof so as to elevate the front end of the housing to facilitate projection of the slides.

Accordingly, it is seen that a relatively simply constructed and durable projection mechanism is provided in which slides are stored in a magazine and directly supplied to a position in front of a projection opening for projection by the lens system thereof. The slide changing mechanism used in the projector is also relatively simple and supports the lowermost slide in the magazine at the projection opening and thence moves the slide to a discharge position while supporting the remainder of the slides in the magazine. As a result, a minimum of structure is required in order to change and project the slides in the projector of the present invention. This is in contradistinction to previously proposed devices wherein relatively complex slide changing mechanisms are required.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A slide projector comprising a housing having a projection opening therein, means in said housing for directing light through said opening, rack means for supporting a vertical column of slides in edge to edge relation above said projection opening and from which individual slides may fall into position in alignment with said opening for projection; and slide transport means for receiving and supporting the lowermost slide in said stack at said position in alignment with said projection opening and for selectively removing said lowermost slide from said position in alignment with said opening to a discharge position while simultaneously supporting the remainder of the slides in the stack in said rack means; said slide transport means comprising a relatively flat plate slidably mounted in said housing for movement between first and second positions in a path of travel located directly below said rack means and adjacent said projection opening, said plate having an upwardly opening recess formed therein located adjacent one end of the plate in position to be below said rack means in the first position of said plate thereby to receive the lowermost slide in the rack as the lowermost slide falls into the recess; and said plate including an upper edge portion extending from said recess towards the other end of said plate, said upper edge portion of said plate supporting thereon the next slide in said rack as said plate is moved between said first and second positions thereby preventing downward movement of the slides in said rack until the plate is in said first position with said recess located below said rack means.

2. The projector as defined in claim 1 wherein said recess has a configuration which is substantially complementary to that of said slides and said top edge of said plate is located slightly below the top edge of a slide supported in said recess.

3. The projector as defined in claim 1 wherein said rack means has an elongated vertically extending and relatively narrow track formed therein for supporting a single row of slides in vertical edge to edge relation, the width of said track being substantially equal to the width of a single slide.

4. The projector as defined in claim 1 including means on said housing for removing a slide from the recess in said plate as said plate enters its second position.

5. The projector as defined in claim 4 wherein said removing means comprises a cam surface formed on said projector housing at the second position of said plate for engaging a slide supported in said recess as said plate approaches its second position and urging said slide out of the recess.

6. The projector as defined in claim 1 including means for moving said plate between said first and second positions.

7. The projector as defined in claim 6 wherein said moving means comprises a cylinder, a piston slidably mounted in said cylinder and operatively connected to said plate and a bellows, operatively connected to said cylinder, said bellows upon being squeezed supplying air to said cylinder to move said piston therein and said plate from said first to said second position and, upon being released, after squeezing, expanding to produce a reduced pressure in said cylinder causing said piston and thus said plate to return from said second to said first position.

8. The projector as defined in claim 7 wherein said cylinder is formed integrally with said housing.

9. The projector as defined in claim 7 wherein said cylinder and piston are generally square in cross-section.

10. A slide projector comprising a housing having a projection opening therein and means for projecting a slide located in front of said projection opening; a slide transport mechanism in said housing including a slide support magazine located to receive and support a vertical column of slides in edge to edge relation adjacent to and in substantially vertical alignment with said projection opening, a slide transport plate slidably mounted in said housing adjacent said projection opening and below said magazine for movement between a first projection position and a second slide discharge position with respect to said projection opening, and means for moving said plate between said two positions; said transport plate having first and second end portions respectively positioned beneath said slide magazine in said first and second positions of said plate, said first end portion of said plate having an upwardly opening slide receiving recess formed therein which is adapted to receive the lowermost slide in said magazine when said transport plate is in said first position thereof, and which is located in alignment with said projection opening when said plate is in its first position whereby said lowermost slide is received in said plate directly from said magazine in position to be projected by said projection means, said recess supporting said lowermost slide therein during movement of said plate from said first projection position to said second slide discharge position.

11. A slide projector comprising a housing having a projection opening therein and means for projecting a slide located in front of said projection opening; a slide transport mechanism in said housing including a slide support magazine located to receive and support a vertical column of slides in edge to edge relation adjacent to and in substantially vertical alignment with said projection opening, a slide transport plate slidably mounted in said housing adjacent said projection opening and below said magazine for movement between a first projection position and a second slide discharge position with respect to said projection opening, and means for moving said plate between said two positions; said transport plate having first and second end portions respectively positioned beneath said slide magazine in said first and second positions of said plate, said first end portion of said plate having an upwardly opening slide receiving recess formed therein which is adapted to receive the lowermost slide in said magazine when said transport plate is in said first position thereof, and which is located in alignment with said projection opening when said plate is in its first position whereby said lowermost slide is projected by said projection means, said recess supporting said lowermost slide therein during movement of said plate from said first projection position to said second slide discharge position; said transport plate having an upper edge portion extending from said recess towards said second end of the plate, said upper edge portion of said plate supportingly engaging the next slide in said magazine for supporting said next slide and the remainder of the slides in said magazine during movement of said transport plate between said first and second positions thereby to prevent downward movement of the slides in said magazine until said transport plate is in said first projection position with said recess below said magazine wherein the next slide in said magazine falls into said recess in alignment with said projection opening for projection by said projection means.

12. The projector as defined in claim 11 wherein said recess has a configuration which is substantially complementary to that of said slides and said top edge of said plate is located slightly below the top edge of a slide supported in said recess.

13. The projector as defined in claim 12 including means on said housing for removing a slide from the recess in said plate as said plate enters its second position.

14. The projector as defined in claim 13 wherein said removing means comprises a cam surface formed on said projector housing at the second position of said plate for engaging a slide supported in said recess as said plate approaches its second position and urging said slide out of the recess.

15. The projector as defined in claim 13 including means for moving said plate between said first and second positions.

16. The projector as defined in claim 15 wherein said moving means comprises a cylinder, a piston slidably mounted in said cylinder and operatively connected to said plate and a bellows, operatively connected to said cylinder, said bellows upon being squeezed supplying air to said cylinder to move said piston therein and said plate from said first to said second position and, upon being released, after squeezing, expanding to produce a reduced pressure in said cylinder causing said piston and thus said plate to return from said second to said first position.

17. A slide projector comprising a housing having a projection opening therein, means in said housing for directing light through said opening, rack means for supporting a vertical column of slides in edge to edge relation above said projection opening and from which individual slides may fall into position in alignment with said opening for projection; and slide transport means for simultaneously receiving and supporting the lowermost slide in said stack at said position in alignment with said projection opening and for selectively removing said lowermost slide from said position in alignment with said opening to a discharge position while simultaneously supporting the remainder of the slides in the stack in said rack means; said slide transport means including a plate slidably mounted in said housing for movement between said first and second positions in a path of travel located directly below said rack means; said plate including means located below said rack means, in the first position of the plate, for receiving and supporting the lowermost slide in the rack in alignment with said projection opening whereby the slide is adapted to be transported and moved from said position in alignment with the projection opening to said discharge position upon movement of the plate to its second position.

18. A slide projector comprising a housing having a projection opening therein, means in said housing for directing light through said opening, rack means for supporting a vertical column of slides in edge to edge relation above said projection opening and from which individual slides can move to a position in alignment with said projection opening; and a slide transport plate slidably mounted in said housing for movement between first and second positions in a path of travel located directly below said rack means and through said position in alignment with the projection opening; said plate having means for engaging a slide located in said position in alignment with said projection opening and an upper edge portion extending rearwardly from said engaging means in the direction of travel of the plate from its first to its second position, said upper edge portion of the plate supporting thereon the next slide in the rack as the plate is moved to its second position, thereby preventing downward movement of the slides in said rack until said plate returns to its first position.

19. The projector as defined in claim 18 wherein said engaging means comprises means for receiving the lowermost slide from said rack and for supporting that slide at said position in alignment with the projection opening whereby the slide will be transported from said position in alignment with said opening with the plate as the plate moves to its second position.

* * * * *